Nov. 11, 1947.    D. B. GARDINER    2,430,811
EQUALIZER VALVE CARTRIDGE ASSEMBLY
Filed Sept. 14, 1944

INVENTOR.
DUNCAN B. GARDINER
BY
ATTORNEY

Patented Nov. 11, 1947

2,430,811

UNITED STATES PATENT OFFICE 2,430,811

EQUALIZER VALVE CARTRIDGE ASSEMBLY

Duncan B. Gardiner, Detroit, Mich., assignor to Vickers Incorporated, Detroit, Mich., a corporation of Michigan Application September 14, 1944, Serial No. 554,023

4 Claims. (Cl. 303—54)

1

This invention relates to power transmissions, particularly to those of the type comprising two or more fluid pressure energy translating devices, one of which may function as a pump and another as a fluid motor.

This invention is more particularly concerned with power transmission systems adapted for use in applying selectively variable force to a load device such as a vehicle or aircraft brake.

In providing power-operated means for applying the brakes under manual control of larger aircraft, it is the practice to tap the main hydraulic power system operating main landing gear, wing flaps, etc. It is a problem to design an equalizing valve for such a system because system pressure is higher than can be safely utilized in hydraulic cylinders operating the brakes.

It is also a problem to overcome an unavoidable time lag between the depression of the foot pedal and the application of the brake due to the length and small size of the lines used. There is a tendency upon the part of the operator because of this time lag to further apply the brakes with a consequent grabbing of the brakes which may result in serious accident.

It is also a problem to design an equalizing valve which will give the operator a feel closely resembling the feel experienced by the operator of an automobile brake.

It is an object of the present invention to safely utilize power-operated means for manually applying the brakes of larger aircraft and, at the same time, to give the operator of such brakes a manual feel closely resembling the feel experienced by the operator of an automobile brake.

It is also an object of the present invention to provide a means overcoming the tendency of the operator to further apply the brakes because of an unavoidable time lag and thus solving the problem of grabbing brakes.

It is a further object of the present invention to provide an equalizing valve containing a unitary valve cartridge assembly of simplified construction which contains the main working parts of the equalizing valve, which cartridge may be easily assembled or disassembled. This makes it possible in case of excessive wear of one or more parts of such cartridge to easily remove the cartridge, replace the worn part or parts, reassemble and replace in such valve.

Further objects and advantages of the present invention will be apparent from the following description, reference being had to the accompanying drawing wherein a preferred form of the present invention is clearly shown.

In the drawing:

Figure 1 is a diagrammatic view of a brake control circuit incorporating a cross-sectional view

2 of an equalizing valve incorporating a preferred embodiment of the present invention.

Figure 1:
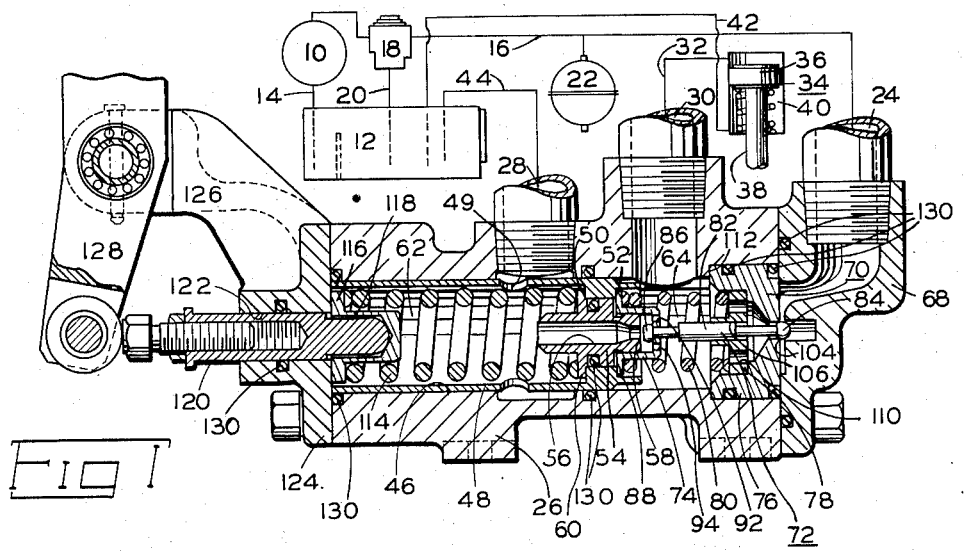

Referring now to Figure 1, there is shown a pump 10 which may be driven by any suitable means, such as an aircraft engine, not shown, which may withdraw fluid from a reservoir 12 by means of a suction conduit 14 and having a pump delivery conduit 16 connected to an unloading valve 18. The unloading valve 18 will bypass pump delivery to the reservoir 12 by means of a return line 20 when the pressure in an accumulator 22 reaches a predetermined maximum.

The pump delivery conduit 16 extends and is connected to the pressure port 24 of an equalizing valve 26. The equalizing valve 26 also contains an exhaust port 28 and an operating chamber port 30. A conduit 32 connected to operating chamber port 30 is connected also to the head end of a cylinder 34 in which is mounted a slidable piston 36 on a rod 38. The piston 36 is held in its uppermost position by a spring 40. The rod end of the cylinder 34 is connected by a drain conduit 42 to the reservoir 12. The exhaust port 28 of the equalizing valve 26 is connected to the reservoir 12 by a conduit 44.

The equalizing valve 26 has a centrally stepped bore 46 connecting with the pressure port 24, operating chamber port 30 and exhaust port 28. Shiftable within the bore 46 is a hollow feel plunger 48 with shoulders 50 and 52 and having a passageway 49 therein aligned with the exhaust port 28. An exhaust valve seat insert 54, having a longitudinal stepped bore 56 forming at the smaller end of such bore an exhaust poppet seat 58, fits within the hollow feel plunger 48 so that a flange 60 of exhaust valve seat insert 54 rests on the shoulder 50 of the feel plunger 58.

With the exhaust valve seat insert 54 inserted in the bore 46 and thus connected to feel plunger 48, the longitudinal bore 46 of valve 26 is divided into two chambers, a main spring chamber 62 and an operating chamber 64, with the only means of communication between the two chambers being bore 56 of exhaust valve seat insert 54.

Removably mounted in the bore 46 between exhaust valve seat insert 54 and an end cap 68 is a unitary valve cartridge 70 having a unitary valve 72, a first valve guide and spring retainer 74, a retainer member 76, a second valve guide 78, and a connecting spring 80.

Figures 2, 4:
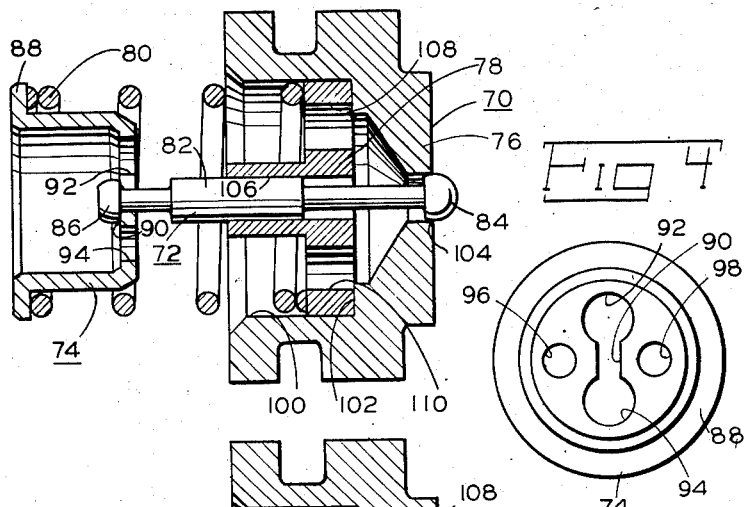
Figure 2 is a longitudinal cross-sectional view of the unitary valve cartridge assembly.
Figure 4 is a fragmentary end view of a portion of the valve.
Figure 3:
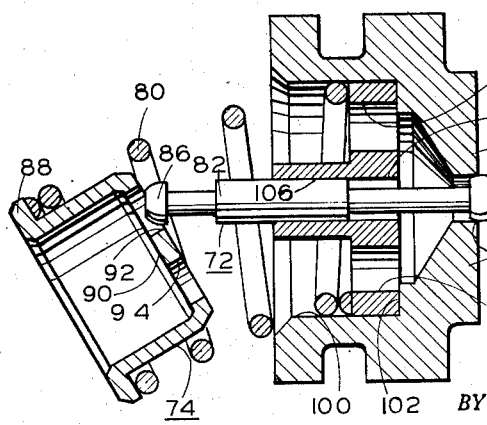
Figure 3 is a view corresponding to Figure 2 showing the unitary valve cartridge assembly in the process of assembly.

Referring to Figures 2 through 4, the unitary valve 72 is comprised of a rod 82 at one end of which is a pressure poppet 84 and at the other end of which is an exhaust poppet 86 smaller than the pressure poppet 84. The valve guide and spring retainer 74 is a hollow cup-shaped member having a flare 88, a slot 90 with enlarged portions 92 and 94 at each end of such slot, and drilled passageways 96 and 98. The retainer member 76 has a centrally stepped bore 100 having shoulders 102 and forming at its smallest portion a pressure poppet seat 104. The valve guide 78 has a bore 106 for receiving the central portion of valve 72 and drilled passageways 108 and 110.

In assembling the cartridge 70, as is more clearly illustrated in Figure 3, the valve guide 78 fits in the stepped bore 100 and rests on the shoulder 102 of the retainer member 76. The unitary valve 72 is inserted through the seat 104 of retainer member 76 and the slot 90 of valve guide 74, with the inner side of pressure poppet 84 resting on the pressure poppet seat 104. The connecting spring 80 is then placed over the unitary valve 72 on the unitary guide 74 and at this point, as is more clearly illustrated in Figure 3, the exhaust poppet 86 is inserted in either enlarged portion 92 or 94 of slot 90 and centered therein with the inner side of exhaust poppet 86 resting on slot 90. The cartridge assembly 70 fits into the longitudinal stepped bore 46 of valve 26 with the unitary valve guide and spring retainer 74 fitting around exhaust valve seat insert 54, with the flare 88 of guide 74 resting against the shoulder 52 of exhaust valve seat insert 54, and with the retainer member 76 resting against a shoulder 112 of the enlarged portion of bore 46 and the whole cartridge assembly being held firmly in place by the end cap 68.

With the cartridge 70 thus inserted, the inner side of pressure poppet 84 is resting on the pressure poppet seat 104 and the outer side of the exhaust poppet 86 is slightly off of exhaust poppet seat 58, being maintained there by the action of spring 80. In this position, as is illustrated in Figure 1, communication is established between the operating chamber 64 and exhaust port 28 by means of drilled passageways 96 and 98 and stepped bore 100 of exhaust valve seat insert 54.

A main operating spring 114 fits in the hollow of feel plunger 48 resting on flange 60 of exhaust valve seat insert 54. A spring abutment 116, containing a cavity 118, fits on the opposite end of main spring 114. A control plunger 120, shiftable within a bore 122 of an end cap 124, fits into the cavity 118 of spring abutment 116. The end cap 124, fitting over abutment 116, holds main spring 114 securely in place.

Suitable linkage 126, connected to lever 128 which connects to the control plunger 120, is so arranged that, by depressing a foot pedal, not shown, the control plunger 120 will be actuated.

Suitable packing rings designated 130 are provided at the points shown on the drawing to seal against fluid leakage. The end caps 68 and 124 are secured to the body of the equalizing valve 26 by suitable bolts.

In operation, with the pump 10 running and with fluid under pressure stored in the accumulator 22 and with the equalizer valve 26 in the position illustrated in Figure 1, pressure poppet 84 is seated on seat 104 and exhaust poppet 86 is slightly off from seat 58. In this position, fluid under pressure is unable to enter the equalizer valve 26 because of pressure poppet 84 being seated and blocking communication to the main operating chamber 64. Spring 40 is able to hold piston 36 of cylinder 34 in the upright position shown because of the absence of pressure in operating chamber 64 of valve 26. This absence of pressure is due to the fact that the exhaust poppet 86 is unseated which permits communication between the upper side of piston 36 and tank 12 by means of conduit 32, port 30, chamber 64, bore 56, exhaust port 28 and conduit 44.

If the brake pedal is now depressed, lever 126, which is connected to the brake pedal by mechanical linkage, will actuate control plunger 120. The control plunger 120, which fits in a cavity of spring abutment 116, will actuate main spring 114. The main spring 114, which rests on the flange 60 of exhaust valve seat insert 54, will shift the feel plunger 48 because flange 60 of exhaust valve seat insert 54 rests on shoulder 50 of feel plunger 48. This movement of feel plunger 48 pushes the exhaust seat 58 onto exhaust poppet 86, thereby blocking communication between the operating chamber 64 and exhaust port 28, and establishes a thrust contact of the feel plunger 48 with the unitary valve 72.

The only opposition of the main operating spring 114 to pushing the exhaust seat 58 on the exhaust poppet 86 is the resistance of the cartridge-connecting spring 80 which is relatively slight. Once the exhaust seat 58 establishes contact with exhaust poppet 86, any further movement of feel plunger 48 which is shifted by main operating spring 114 will meet not only the resistance of the cartridge-connecting spring 80 but also the resistance of fluid under pressure acting against the pressure poppet 84. This is due to the fact that the pressure poppet 84 is at the other end of the connecting rod 82 of unitary valve 72, with the pressure poppet 84 being exposed to pressure from pressure port 24. When sufficient force has been exerted on the brake pedal to overcome the resistance of the cartridge-connecting spring 80 and of pressure acting against pressure poppet seat area, main spring 114 will actuate feel plunger 48 which has already established contact with the unitary valve 72, and the pressure poppet 84 will be pushed off of its seat 104. When the pressure poppet 84 is unseated, fluid under pressure from accumulator 22 is permitted to enter the operating chamber 64 of valve 26 and is conducted to cylinder 34 by way of operating port 30 and conduit 32. Fluid is prevented from going to tank 12 because of exhaust poppet 86 being seated and blocking communication between operating chamber 64 and exhaust port 28.

It should be noted that, once the main operating spring 114 has overcome the resistance of the cartridge-connecting spring 80 and pressure acting against the pressure seat area and the pressure poppet 84 is unseated, fluid under pressure entering the operating chamber 64 of valve 26 will act on the entire area of feel plunger 48 within bore 46. When piston 36 of cylinder 34 has moved completely or the brake has been fully applied, any further increase of pressure in operating chamber 64 will further act against feel plunger 48, overcoming the resistance offered by main operating spring 114 and consequently will seat the pressure poppet 84.

When the brake is to be released, the brake pedal is retracted to permit main operating spring 114 to return to the position shown in Figure 1. As shoulder 52 of feel plunger 48 abuts the outer side of flare 88 of guide 74 and shoulder 50 of feel plunger 48 abuts the inner side of flange 60 of exhaust valve seat insert 54, pressure in operating chamber 64 and also acting against pressure poppet 84 will return feel plunger 48 and exhaust valve seat insert 54. When the pressure poppet 84 becomes seated, however, exhaust poppet 86, which is still seated, will finally unseat by action of spring 80. The spring 80, which abuts the inner side of flare 88 of guide 74, will shift guide 74, guide 74 will shift feel plunger 48, and feel plunger 48 will shift exhaust valve seat insert 54 containing exhaust valve seat 58 away from exhaust poppet 86, thereby unseating it. Thus, the cartridge-connecting spring 80 performs the double function of maintaining the members of the unitary valve cartridge assembly 70 in assembled position and that of returning feel plunger 48 and exhaust valve seat insert 54, thereby unseating exhaust poppet 86 when the brake is released.

When the feel plunger 48, which is connected to exhaust valve seat insert 54, has returned to the position shown in Figure 1, exhaust poppet 86 is slightly off of exhaust poppet seat 58 which establishes communication between the operating chamber 64 and tank 12 by means of passageways 96 and 98 of guide 74, bore 56 of exhaust valve seat insert 54, main operating spring chamber 62, passageway 49 of feel plunger 48, exhaust port 28 and conduit 44. This permits fluid on the upper side of piston 36 to escape to tank 12 and, with the release of pressure, spring 40 will return piston 36 to its uppermost position shown in Figure 1.

It should be noted that the main operating spring 114 which actuates the feel plunger 48 acts against fluid under pressure from accumulator 22, first against pressure poppet seat area and once the pressure poppet 84 has been pushed from its seat 104 against the full area of feel plunger 48 within bore 46. This results in an operator feel which is instantaneous and positive at all times, whether the brake is being applied or released.

It should further be noted that the guide member 78 through which rod 82 is shiftable, being in alignment with the pressure and exhaust valve seats, assures positive seating of the valves and, because lateral movement of the rod is prevented, also prevents any violent movement to which the cartridge assembly is exposed from displacing the valves from their seats.

It should also be noted that the unitary valve cartridge 70 comprises a complete subassembly of interconnected members which are mutually self-supporting, independent of other fastening means of any nature. The cartridge and individual members of the same are designed and constructed to facilitate removal of the complete cartridge from the equalizing valve in case repair or replacement are necessary.

While the form of embodiment of the invention as herein disclosed constitutes a preferred form, it is to be understood that other forms might be adopted, all coming within the scope of the claims which follow.

What is claimed is as follows:

1. A cartridge subassembly for an equalizing valve comprising mutually self-supporting members and having a unitary valve comprising a rod at each end of which is a head, one being smaller than the other, a spring retaining means having an opening with a head engaging portion at its center and with a larger portion capable of passing over the smaller head of the valve, said larger portion being laterally displaced from the head engaging portion, a second spring retaining means having an opening abutting the inner side of the larger head of the valve, a guide member, through which the rod is perpendicularly shiftable, mounted in the second spring retaining means, and a spring maintaining all members in assembled position.

2. A cartridge subassembly for an equalizing valve comprising mutually self-supporting members and having a unitary valve comprising a rod at each end of which is a head, one being smaller than the other, a spring retaining means having an opening with a head engaging portion at its center and with a larger portion capable of passing over the smaller head of the valve, said larger portion being laterally displaced from the head engaging portion, a second spring retaining means having an opening forming a seat for and abutting the inner side of the larger head of the valve, a guide member having an opening in alignment with the head-engaging portion and the seat, respectively, of the first and second spring retaining means through which the rod is shiftable, and a spring maintaining all members in assembled position.

3. A cartridge subassembly for an equalizing valve comprising mutually self-supporting members and having a unitary valve comprising a rod at one end of which is formed a poppet exhaust valve and at the other end a poppet pressure valve larger than the exhaust valve, a spring retaining means having an opening forming an exhaust valve seat at its center for engaging the exhaust valve and having a larger portion capable of passing over the exhaust valve laterally displaced from the exhaust valve seat, a second spring retaining means having an opening forming a pressure valve seat for engaging the inner side of the pressure valve, a guide member having an opening in alignment with the exhaust and pressure valve seats through which the rod is shiftable for insuring positive seating of the pressure and exhaust valves, and a spring maintaining all members in assembled position.

4. A cartridge subassembly for an equalizing valve comprising mutually self-supporting members and having a unitary valve comprising a rod at one end of which is formed a poppet exhaust valve and at the other end a poppet pressure valve larger than the exhaust valve, a spring retaining means having an opening forming an exhaust valve seat at its center for engaging the exhaust valve and having a larger portion capable of passing over the exhaust valve laterally displaced from the exhaust valve seat, a second spring retaining means having an opening forming a pressure valve seat for engaging the inner side of the pressure valve, a guide member mounted in the second spring retaining means having an opening in alignment with the exhaust and pressure valve seats through which the rod is shiftable for insuring positive seating of the pressure and exhaust valves, and a spring maintaining all members in assembled position.

DUNCAN B. GARDINER.

REFERENCES CITED

The following references are of record in the file of this patent:

UNITED STATES PATENTS

| Number | Name | Date |
| --- | --- | --- |
| 2,075,917 | Vorech | Apr. 6, 1937 |
| 2,266,817 | Schober | Dec. 23, 1941 |
| 1,420,898 | Willey | June 27, 1922 |